(12) United States Patent
Iwase et al.

(10) Patent No.: US 6,809,439 B2
(45) Date of Patent: Oct. 26, 2004

(54) STEPPING MOTOR

(75) Inventors: Masato Iwase, Tokyo (JP); Masaaki Takagi, Tokyo (JP)

(73) Assignee: Nidec Copal Corporation, Tokyo (JP)

(*) Notice: Subject to any disclaimer, the term of this patent is extended or adjusted under 35 U.S.C. 154(b) by 0 days.

(21) Appl. No.: 10/225,153

(22) Filed: Aug. 22, 2002

(65) Prior Publication Data

US 2003/0048012 A1 Mar. 13, 2003

(30) Foreign Application Priority Data

Aug. 23, 2001 (JP) .................................... P2001-253011

(51) Int. Cl.[7] .............................................. H02K 37/00
(52) U.S. Cl. ................................... 310/49 R; 310/208
(58) Field of Search .............................. 310/49 R, 254, 310/258, 259, 208, 216, 156.11, 156.14

(56) References Cited

U.S. PATENT DOCUMENTS 4,818,911 A * 4/1989 Taguchi et al. ............. 310/259
5,334,894 A * 8/1994 Nakagawa ................. 310/49 R
2002/0005670 A1  1/2002 Takagi et al.

FOREIGN PATENT DOCUMENTS

| JP | 2-142976 | 12/1990 |
|----|----------|---------|
| JP | 5-161332 | 6/1993 |
| JP | 2000-251270 | 9/2000 |
| JP | 2000-293864 | 10/2000 |

* cited by examiner

Primary Examiner—Thanh Lam
(74) Attorney, Agent, or Firm—McGinn & Gibb, PLLC

(57) ABSTRACT

It is a stepping motor enabled to prevent generation of detent torque therein and arbitrarily set the detent torque. This stepping motor has a rotor constructed by rotatably supporting a shaft, to which a multi-polarized permanent magnet (3) is fixed, and a stator consisting of a plurality of air-core coils (4, 5), each of which is made from a predetermined number of turns of a wire wound around an axis perpendicular to a central axis of rotation of the rotor, to be placed along a peripheral surface of the permanent magnet (3) and to be evenly disposed to face one another.

20 Claims, 8 Drawing Sheets

FIG. 4

NUMBER OF POLES - NUMBER OF COILS

| NUMBER OF POLES OF MAGNET (PIECES) | NUMBER OF COILS (PIECES) | | |
|---|---|---|---|
| | 1ST PHASE COIL | 2ND PHASE COIL | TOTAL |
| 2 | 1 | 1 | 2 |
| 4 | 1 | 1 | 2 |
| 6 | 2 | 2 | 4 |
| 8 | 2 | 2 | 4 |
| 10 | 2 | 2 | 4 |
| 12 | 2, 3, 4 | 2, 3, 4 | 4, 6, 8 |

$\phi D > d$

STEPPING MOTOR

BACKGROUND OF THE INVENTION

The present invention relates to a stepping motor.

According to a conventional stepping motor, rotation preventing torque (hereunder sometimes referred to as detent torque) occurs owing to a structure thereof, in which magnetic pole teeth of a yoke are respectively placed corresponding to armature windings of a stator. The conventional stepping motor has an advantageous in that an object to be driven can be held at a predetermined place by effectively utilizing this detent torque. However, for example, when a microstep driving operation is performed, it may be difficult to achieve high-speed positioning of a rotor under the influence of the detent torque.

That is, the conventional stepping motor is constructed so that a rotating magnetic field is generated by winding a coil around each of the magnetic pole teeth of the yoke, which is placed in such a way as to be coaxially placed with a rotor, and applying a pulse voltage to each of the coils, and that thus, the rotor is driven to rotate by a predetermined stepping angle. Thus, a stepping angle for the rotation of the rotor is determined according to both the number of stator poles and that of rotor poles. Further, to perform a driving operation of rotating the rotor in units of a finer stepping angle, the number of the rotor poles and the number of yoke teeth are increased. Alternatively, an energizing method is devised.

Furthermore, even during a non-energized time, an attracting force acts between multi-polarized permanent magnet and each of the magnetic pole teeth, so that detent torque occurs. Thus, the conventional stepping motor has a function of self-holding a rotation angle position of the rotor.

A holding force of the rotor due to this detent torque enables the self-holding of the rotation angle position thereof during the non-energized time, whereas this holding force sometimes becomes an obstacle to an operation of driving the rotor to rotate.

Meanwhile, an object to be driven by a stepping motor is, for instance, an optical pickup disclosed in JP-A-2000-251270 and JP-A-2000-293864. This optical pickup is driven at a high speed in a radial direction of a recording/reproduction surface of an optical disk adapted to rotate at a high speed. Further, this optical pickup is required to instantaneously stop. Thus, rapid response of the stepping motor is demanded. However, sometimes, the detent torque is an obstacle to enhancement of this rapidity of the response. Meanwhile, according to a stepping motor for use in an autofocus mechanism of an optical camera, a microstep driving operation is performed. Thus, it is requested to perform a driving operation of rotating the rotor in units of a stepping angle, which is finer than the conventionally employed stepping angle.

As described above, a stepping motor enabled to achieve a driving operation unaffected by the detent torque is desired.

SUMMARY OF THE INVENTION

Accordingly, the invention is accomplished in view of the aforementioned problems. An object of the invention is to provide a stepping motor that is prevented from being affected by detent torque during a driving operation and during a stop time, thereby to facilitate a micro-step driving operation and to improve a starting characteristic.

Further, another object of the invention is to provide a stepping motor enabled to arbitrarily set a point of generation of detent torque so as to stop a rotor at a given angular position.

Moreover, another object of the invention is to provide a stepping motor that can be constructed in such a way as to be compact and flat in a longitudinal direction along a shaft of rotation of a rotor.

In order to solve the aforesaid object, the invention is characterized by having the following arrangement.

(1) A stepping motor enabled to prevent generation of detent torque therein and arbitrarily set the detent torque, the stepping motor comprising:
   a rotor including a shaft and a multi-polarized permanent magnet fixed to the shaft;
   a stator including a plurality of air-core coils, each of which is made from a predetermined number turns of a wire wound around an axis perpendicular to a central axis of rotation of the rotor and is placed along a peripheral surface of the permanent magnet and face each other.

(2) The stepping motor according to (1), wherein
   the plurality of air-core coils are provided as sets of first air-core coils and second air-core coils,
   the set of first air-core coils faces the permanent magnet and is disposed at a circumferentially equally spaced position,
   the set of second air-core coils is disposed at a circumferentially equally spaced position that is angularly spaced from the set of first air-core coils by an angular deviation, which is a phase angle of 90 degrees, and
   generation of rotating torque including a couple of forces is enabled by energizing the set of first air-core coils and the set of second air-core coils.

(3) The stepping motor according to (1), wherein
   the permanent magnet is polarized so that the number of poles thereof is one of 2, 4, 6, 8, 10, and 12, and
   a 2-phase excitation driving operation is enabled by setting the number of the air-core coils to be one of 2, 4, 6, and 8 and evenly allocating the air-core coils to first and second phase coils, respectively, along the peripheral surface of the permanent magnet to obtain an electrical angle of 90 degrees as the angular deviation.

(4) The stepping motor according to (1), wherein each of the air-core coils is wound at an angular position, at which a center of a nearly rectilinear constituent part thereof in a direction of rotation of the rotor contributing to rotation of the rotor coincides with a corresponding one of N-poles and S-poles of the permanent magnet.

(5) The stepping motor according to (1), wherein a length of a conductor perpendicular to a magnetic field is increased as much as possible by setting a length of the nearly rectilinear constituent part of the air-core coils in a direction of rotation of the rotor, which contributes to rotation of the rotor, to be equal to or longer than a length in a longitudinal direction along an axis of rotation of the permanent magnet.

(6) The stepping motor according to (1) further comprising a supplemental yoke for arbitrarily setting a point of generation of detent torque so as to stop the rotor at a given angular, position.

(7) The stepping motor according to (1), wherein
   the stator includes a resin member integrally forming arm parts radially extended from an inside diameter side to an outside diameter side on a circle surface concentric with a center of rotation of the rotor, and
   the resin member holds the air-core coils so that angular position relation between the air-core coils and magnetic poles of the permanent magnet is maintained.

(8) The stepping motor according to (7), wherein a supplemental yoke for arbitrarily setting a point of generation of detent torque so as to stop the rotor at a given angular position is embedded in the resin member.

(9) A 2-phase excitation type PM stepping motor enabled to prevent generation of detent torque therein and arbitrarily set the detent torque, the stepping motor, comprising:

a rotor including a shaft and a permanent magnet fixed to the shaft, the permanent magnet being polarized so as to have poles of the number that is one of 6, 8, 10, and 12;

a stator including a total of 4 air-core coils, each of which is made from a predetermined number of turns of a wire wound around an axis perpendicular to a central axis of rotation of said rotor, and is placed along a peripheral surface of the permanent magnet and disposed by dividing the air-core coils into two sets of two air-core coils so as to face each other, wherein the two sets of two air-core coils are evenly allocated to first and second phase coils, respectively, along the peripheral surface of the permanent magnet so as to have an electrical angle of 90 degrees as an angular deviation therebetween to enable a 2-phase excitation driving operation; and a main part serving as a yoke having flat parts obtained by planarizing a space part between the air-core coils, which are disposed to face each other.

BRIEF DESCRIPTION OF THE DRAWINGS

FIG. 4 is a tabular presentation illustrating the relation between the number of magnetic poles of a permanent magnet of a rotor and the number of coils of each of phases respectively corresponding to first and second phase coils.

DETAILED DESCRIPTION OF PREFERRED EMBODIMENTS

Hereinafter, preferred embodiments of the invention are, described with reference to the accompanying drawings.

Figure 1A:
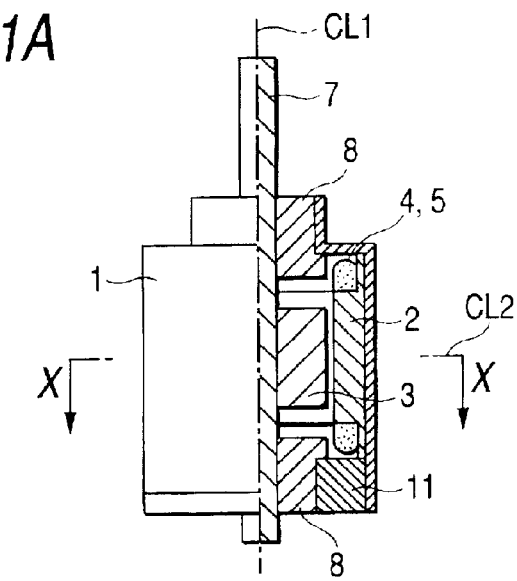
FIG. 1A is a half-sectional view showing a stepping motor that is common to embodiments of the invention.
Figure 1B:
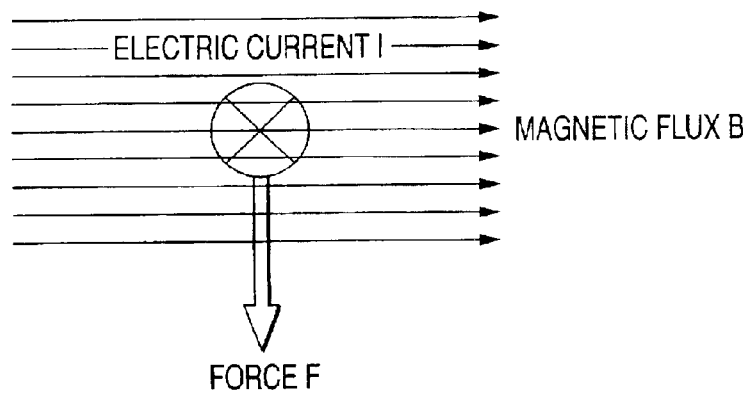
FIG. 1B is a diagram illustrating the principle of an operation of the stepping motor.
Figure 1C:
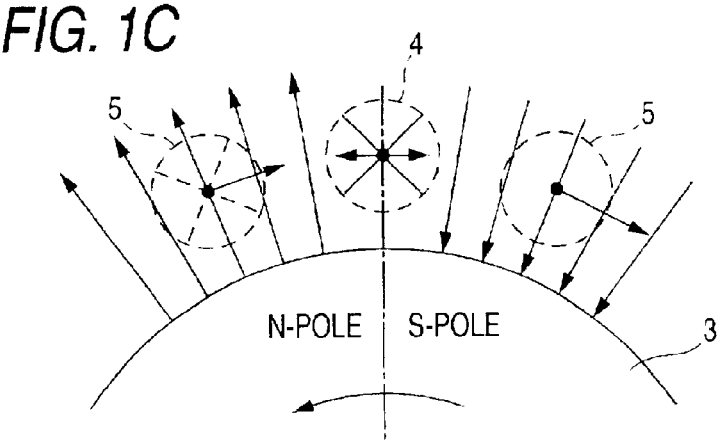
FIG. 1C is a diagram illustrating the principle of an operation thereof by enlarging a part of a section of the stepping motor, which is taken in the direction indicated by arrows along line X—X of FIG. 1A.

FIG. 1A is a half-sectional view showing a stepping motor that is common to embodiments of the invention. FIG. 1B is a diagram illustrating the principle of an operation of the stepping motor. FIG. 1C is a diagram illustrating the principle of an operation thereof by enlarging a part of a section of the stepping motor, which is taken in the direction indicated by arrows along line X—X of FIG. 1A.

Referring to FIG. 1A, there is shown a 2-phase excitation PM stepping motor that is provided with a bearing 8 constituted by an oil impregnated metallic or radial ball bearing fixed to a cylindrical main part 1 and serving as a yoke, and with another bearing 8 constituted by an oil impregnated metallic or radial ball bearing fixed in a cap member 11, which is secured to this main part 1 by a fixing method including crimping after press-fitted thereinto. The shaft 7 is rotatably supported by both these bearings 8 and 8 in a both-side supporting state. The multi-polarized permanent magnet 3 is fixed to a middle part of the shaft 7 at a position illustrated in this figure, and constitutes the rotor of the stepping motor. A predetermined power transmission member (such as a gear) is fixed to the shaft 7 projecting from the main part.

A wire is wound a predetermined number of turns around an axis CL2 perpendicular to a central axis CL1 of rotation of this rotor. A plurality of air-core coils 4 and 5 are held by using the resin member 2 in such a way as to extend along the peripheral surface of the permanent magnet 3. Thus, a stator of the motor is constructed.

With the aforementioned configuration, a force represented by an equation: F=B (magnetic flux)·I (electric current)·L (a length of a conductor) is generated in a direction perpendicular to a magnetic flux B according to Fleming's left hand rule by feeding the electric current I to the air-core coil (a conductor) from the plane of the paper of this figure to the back side thereof in a magnetic field, in which a magnetic flux B is generated from the permanent magnet 6, as illustrated in FIG. 1B that is a diagram illustrating the principle of an operation of the motor.

Then, as shown in FIG. 1C, torque is generated in each of the air-core coils 4 and 5 by energizing the air-core coil 5 indicated by dashed lines, similarly as illustrated in FIG. 1B. Incidentally, the air-core coils are fixed, so that the permanent magnet 3 undergoes torque, which acts in the direction of arrows, as a reaction force, so that the rotor rotates. Additionally, the air-core coil 4 is positioned and fixed in such a way as to be angularly spaced from the air-core coil 5 by an angular deviation, which is an electrical angle of 90 degrees. Subsequently, predetermined step energizing is performed. Thus, the rotor is enabled to perform continuous rotation. The aforementioned principle is the principle of an operation of the stepping motor according to the invention.

First Embodiment

Figure 2A:
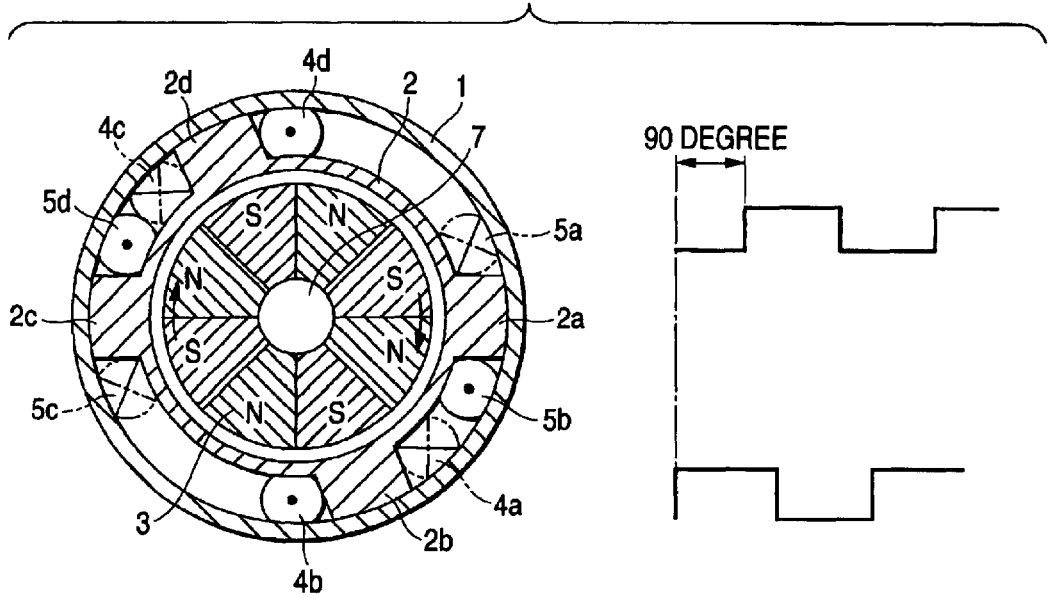
FIG. 2A is a diagram illustrating a first embodiment of the invention, which is taken in the direction indicated by arrows along line X—X of FIG. 1A.

Referring next to FIG. 2A, there is shown a sectional view, which is taken along line X—X of FIG. 1A in the direction of arrows and illustrates the first embodiment. In FIG. 2A, the already described components are designated by same reference characters used in FIGS. 1A to 1C. Further, the description of such components is omitted herein.

The permanent magnet 3 of the rotor is multi-polarized in such a way as to have 8 poles, as illustrated in the figure, and rotatably provided within the inner peripheral surface of the resin member 2 so that a gap is provided therebetween. In this resin member 2, four arm parts 2a to 2d are integrally formed by, for example, injection molding. As illustrated in the figure, each of the arm parts is disposed in such a way as to face a corresponding one of the arm parts. The rectilinear constituent parts 4a, 4b, 4c, 5a, 5a, 5b, 5c, and 5d of the coil windings corresponding to phases are held at evenly angularly spaced positions so that each set of two arms, which are symmetrical with respect to a point, that is, a center of rotation.

The main part 1 is formed like a cylinder from a magnetic material so as to prevent an occurrence of magnetic leakage and to form a closed magnetic circuit.

In the motor of the aforementioned configuration, the first air-core coils and the second air-core coils are positioned and fixed in a state, in which each of the second air-core coils is angularly spaced from a corresponding one of the first air-core coils by an angular deviation that is an electrical angle of 90 degrees, by setting parts 4a, 4b, 4c, and 4d to be the rectilinear constituent parts of the windings of the first-phase air-core coils 4 serving as first air-core coils, and also setting parts 5a, 5b, 5c, and 5d to be the rectilinear constituent parts of the windings of second-phase air-core coils 4 serving as the second air-core coils. Incidentally, a 2-phase excitation type PM stepping motor, whose step angle is 22.5 degrees, can be constructed by energizing the coils with voltage waveshapes that differ from each other in phase by 90 degrees. Moreover, a half-stepping driving operation in a 1–2 phase excitation mode is enabled. Furthermore, although not shown, a stepping motor of the microstep driving type can easily be realized.

Second Embodiment

Figure 2B:
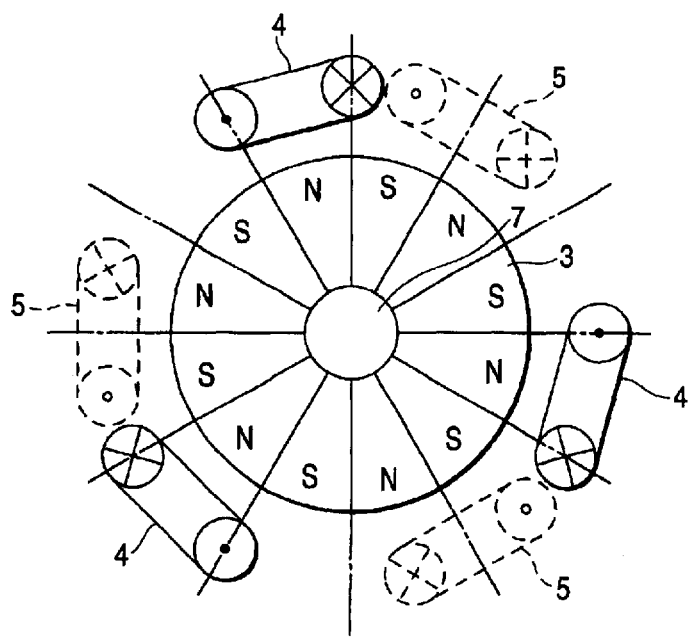
FIG. 2B is a diagram illustrating a second embodiment of the invention, which is, taken in the direction indicated by arrows along line X—X of FIG. 1A.

Referring next to FIG. 2B, there is shown a diagram, which is taken in the direction indicated by arrows along line X—X of FIG. 1A and illustrates a second embodiment of the invention. In this figure, the already described components are designated by same reference characters used in FIGS. 1A to 2A. Further, the description of such components is omitted herein. The permanent magnet 3 is multi-polarized in such a way as to have 12 poles arranged at equal angular intervals of 30 degrees.

The coils 4 and 5 face one another and are evenly disposed so that each of sets 4 and 5 of three coils, which are symmetrical with respect to a center of rotation of the rotor, corresponds to a single phase, as illustrated in the figure.

A stepping motor, whose stepping angle is 15 degrees, can be constructed by energizing the first-phase three coils 4, which are indicated by solid lines, and the second-phase three coils 5, which are indicated by dashed lines, of the motor of the herein-above described configuration with signals having waveforms shown in FIG. 2A.

Third Embodiment

Figure 3A:
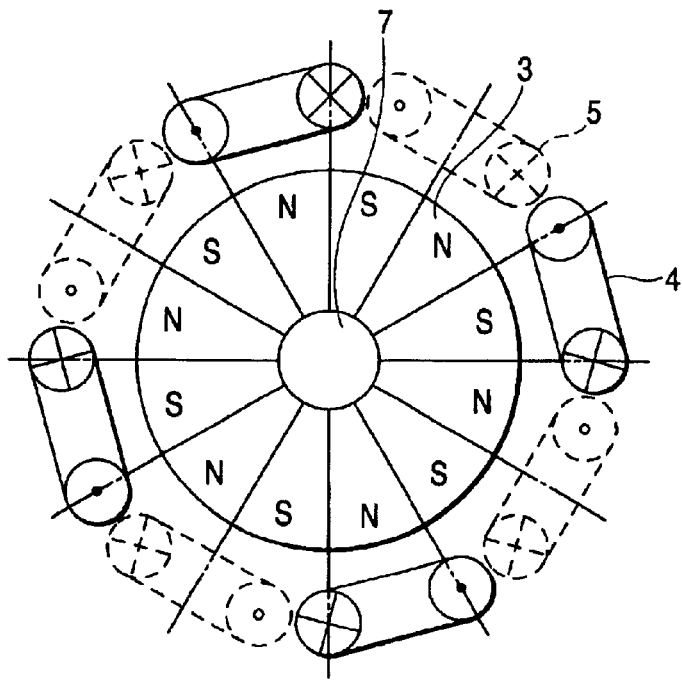
FIG. 3A is a diagram illustrating a third embodiment of the invention, which is taken in the direction indicated by arrows along line X—X of FIG. 1A.

Referring to FIG. 3A, there is shown a diagram, which is taken in the direction indicated by arrows along line X—X of FIG. 1A and illustrates a third embodiment of the invention. As shown in this figure, the permanent magnet 3 is multi-polarized in such a way as to have 12 poles.

The coils 4 and 5 face one another and are evenly disposed so that each of sets 4 and 5 of four coils, which are symmetrical with respect to a center of rotation of the rotor, corresponds to a single phase, as illustrated in the figure.

A stepping motor, whose stepping angle is 15 degrees, with larger torque can be constructed by energizing the first-phase four coils 4, which are indicated by solid lines, and the second-phase four coils 5, which are indicated by dashed lines, of the motor of the herein-above described configuration with signals having waveforms shown in FIG. 2A.

Fourth Embodiment

Figure 3B:
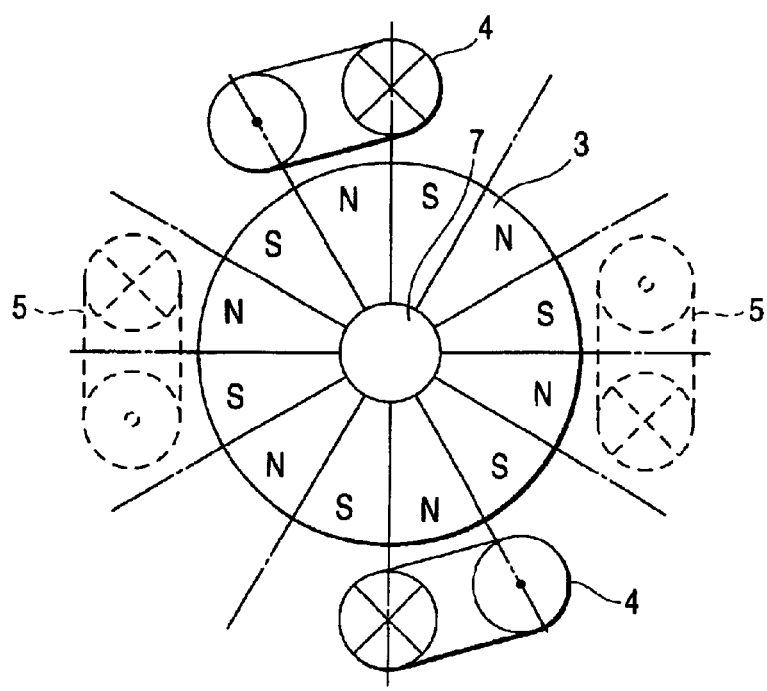
FIG. 3B is a diagram illustrating a fourth embodiment of the invention, which is taken in the direction indicated by arrows along line X—X of FIG. 1A.

Referring next to FIG. 3B, there is shown a diagram, which is taken in the direction indicated by arrows along line X—X of FIG. 1A and illustrates a fourth embodiment of the invention. As shown in this figure, the permanent magnet 3 is multi-polarized in such a way as to have 12 poles.

The coils 4 and 5 face one another and are evenly disposed so that each of sets 4 and 5 of two coils, which are symmetrical with respect to a center of rotation of the rotor, corresponds to a single phase, as illustrated in the figure.

A stepping motor, whose stepping angle is 15 degrees, with larger torque can be constructed by energizing the first-phase two coils 4, which are indicated by solid lines, and the second-phase two coils 5, which are indicated by dashed lines, of the motor of the herein-above described configuration in a direction perpendicular to the plane of the paper of this figure with signals having waveforms shown in FIG. 2A.

FIG. 4 is a tabular presentation illustrating the relation between the number of magnetic poles of a permanent magnet of a rotor and the number of coils of each of phases respectively corresponding to first and second phase coils. FIG. 4 illustrates a configuration, in which the first-phase coils and the second-phase coils are evenly arranged so that the first-phase coils and the second-phase coils are symmetrical with respect to a point, of another embodiment, in which the number of poles is 2, of the stepping motor having the aforementioned constitution.

Figure 5:
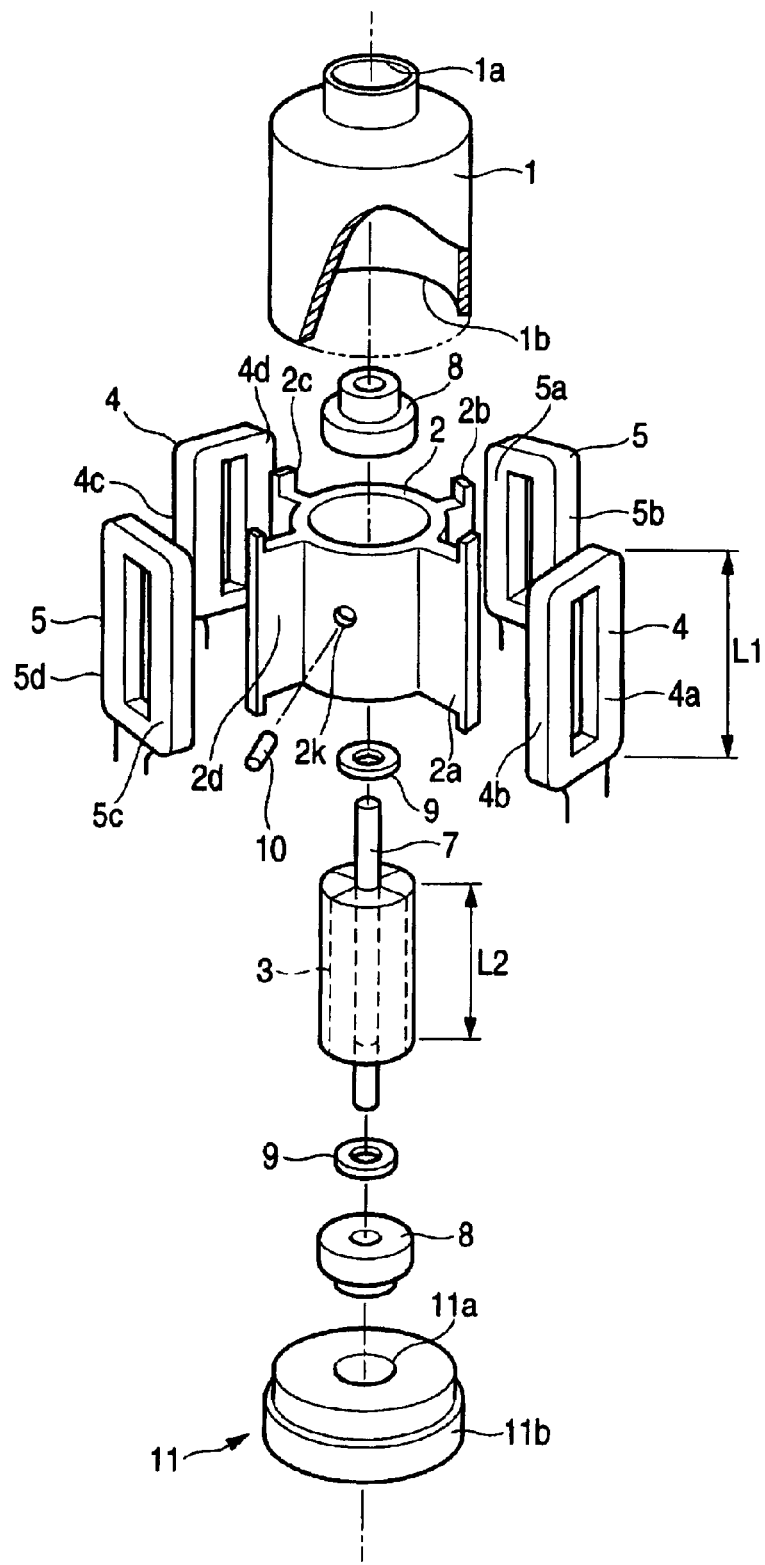
FIG. 5 is a stereographic exploded view showing the stepping motor.

There is another configuration thereof, in which a set of the first-phase two coils and a set of the second-phase two coils are evenly arranged and the positions of the two coils of each of these sets are symmetrical with respect to a point in the case that the number of poles is 6. Moreover, there is another configuration thereof, in which a set of the first-phase two coils and a set of the second-phase two coils are evenly arranged and the positions of the two coils of each of these sets are symmetrical with respect to a point in the case that the number of poles is 10. Furthermore, there is another configuration thereof, in which sets of the first-phase two coils, three coils, and four coils and sets of the second-phase two coils, three coils, and four coils are evenly arranged and the positions of the coils of each of these sets are symmetrical with respect to a point in the case that the number of poles is 12. Referring next to FIG. 5, there is shown a stereographic exploded view of the stepping motor of the configuration illustrated in FIG. 2A.

In FIG. 5, the already described components are designated by same reference characters used in FIGS. 1A to 4. Further, the description of such components is omitted herein. The main part 1 is constructed like a cylinder, as illustrated in this figure that is a partly broken view showing the motor. In the main part 1, an upper opening portion 1a for fixing the bearing 8, and a lower opening portion 1b penetrating and fixing the upper opening part 1a and the cap member 11. Moreover, a hole portion 11 for fixing the bearing 8, and a flange portion 11b for holding the lower opening portion 1b of the main part 1 by abutting there against are formed in the cap member 11 shown in a lower part of this figure. After predetermined parts are assembled thereto, such parts can be fixed thereto in a condition illustrated in FIG. 1A.

The shaft 7, to which the multi-polarized permanent magnet 3 is fixed, is rotatably supported by the upper and lower bearings 8 and 8 in a radial direction. On the other hand, each of washers 9 and 9, which are passed by the shaft 7, for receiving a load imposed in a thrust direction or for preventing occurrence of backlash in the thrust direction is provided between the permanent magnet and a corresponding one of the bearings 8. Thus, the motor is completed.

The resin member 2 enables the arms 2a to 2d to face and be evenly arranged as illustrated in this figure, and also enables the rectilinear constituent parts 4a, 4b, 4c, 4d, 5a, 5b, 5c, and 5d of the coil windings corresponding to the phases to be held at predetermined positions.

Each of the air-core coils of the sets 4 and 5 respectively corresponding to the phases are continuously formed from a single wire. Thus, wiring (not shown) is such that two terminals, that is, the start terminal and the end terminal of the coil corresponding to each phase, therefore, a total of four terminals of the coils are drawn out of the main part 1.

This resin member 2 is provided as the arm parts radially extended from an inside diameter side to an outside diameter side on a surface of a part having a section formed like a circle, which is concentric with the center of rotation of the rotor, for holding the air-core coils. However, in addition to this configuration, there is another configuration in which winding groove parts and salient-pole-shaped parts are integrally formed, to be used for holding the air-core coils. Thus, needless to say, the angular-position relation between the air-core coils and the magnetic poles of the permanent magnet can be maintained.

As illustrated in the figure, the stepping motor is configured so that the length of a conductor perpendicular to a magnetic field is increased as much as possible by setting the length of the nearly rectilinear constituent part L1 of each of the air-core coils 4 and 5 in a direction of rotation of the rotor, which contributes to the rotation of the rotor, to be equal to or longer than the length in a longitudinal direction along an axis of rotation of the permanent magnet 3. Thus, sufficient torque can be obtained.

On the other hand, a hole part or a bore part 2k is dug in, the resin member 2, as shown in the figure. A supplemental yoke 10 formed from a magnetic material is fixed in this bore part 2k. The permanent magnet 3 is attracted by this supplemental yoke 10, so that the rotor is stopped at a given angular position. Thus, a point of generation of detent torque can be arbitrarily set.

Fifth Embodiment

Figure 6:
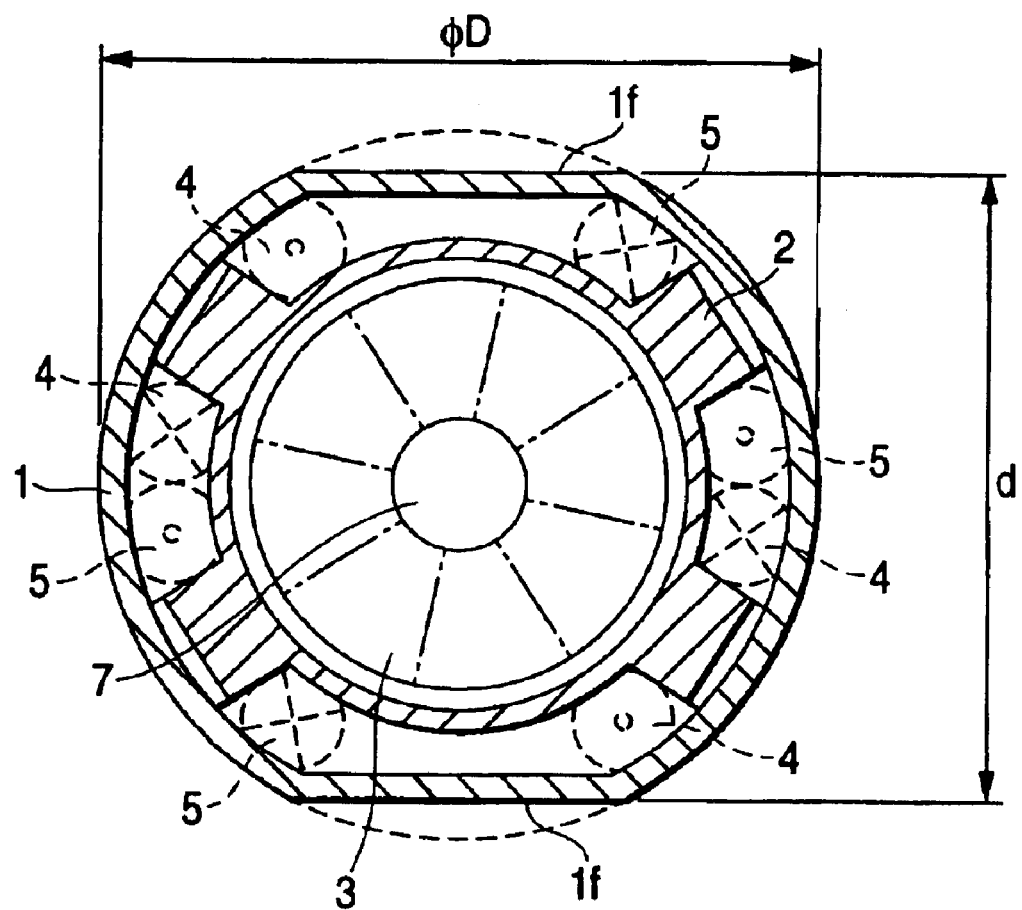
FIG. 6 is a diagram illustrating a fifth embodiment of the invention, which is taken in the direction indicated by arrows along line X—X of FIG. 1A.

FIG. 6 is a diagram, which is taken in the direction indicated by arrows along line X—X of FIG. 1A and illustrates a fifth embodiment of the invention. In FIG. 6, the already described components are designated by same reference characters used in FIGS. 1A to 5. Further, the description of such components is omitted herein. The permanent magnet 3 is multi-polarized in such a way as to have 8 poles. In the resin member 2, sets 4 and 5 of two air-core coils, which are symmetrical with respect to the central axis of rotation of the rotor, are provided. That is, a total of 4 air-core coils 4 and 5 are provided in this resin member 2. The stepping motor is configured so that these air-core coils are evenly allocated to the first-phase coil and the second-phase coil.

As illustrated in the figure, a space part is formed between the air-core coils 4 and 5 by placing each of the air-core coils in the main part 1. Thus, this embodiment can be formed into a shape, in which a dimension d being smaller than a diameter D, by forming flat parts if and if obtained by planarizing portions of the main part 1, which correspond to this space part, at symmetrical positions. Consequently, a partly flat stepping motor can be constructed. Thus, a space occupied by the motor can be reduced.

As described above, the permanent magnet of the rotor is multi-polarized in such away as to have 2n poles (n is an integer equal to or larger than 1). Air-core coils wound on an outer surface of a part having a section formed like a circle, which is concentric with a center of rotation of the rotor, around an axis extending in a direction perpendicular to the center of rotation thereof are attached to the motor. Thus, the air-core coils are present in a magnetic field generated between the outermost part and the main part. Consequently, the stepping motor is enabled to operate like an ordinary coreless motor.

Especially, as described above, the stator is not provided with a yoke having magnetic pole teeth. An outermost main part is provided as a soft magnetic member facing the permanent magnet of the rotor. Additionally, this main part does not have salient, shape at all. Thus, detent torque is not generated. The supplemental yoke can be attached at a given angular position. Consequently, a point of generation of detent torque can be arbitrarily set.

Sixth Embodiment

Figure 7:
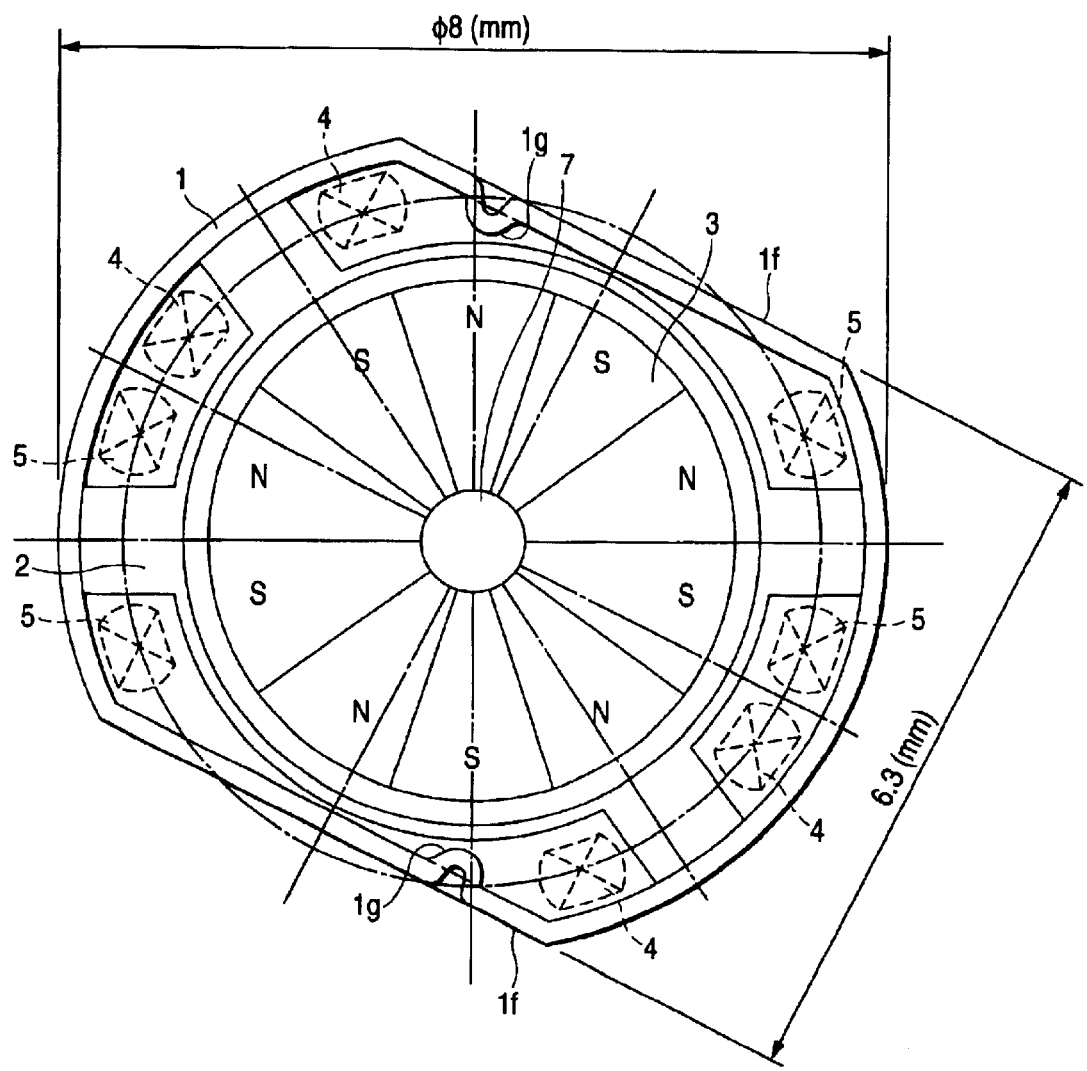
FIG. 7 is a diagram illustrating a sixth embodiment of the invention, which is taken in the direction indicated by arrows along line X—X of FIG. 1A.

FIG. 7 is a diagram, which is taken in the direction indicated by arrows along line X—X of FIG. 1A and illustrates a sixth embodiment of the invention. In FIG. 6, the already described components are designated by same reference characters used in FIGS. 1A to 6. Further, the description of such components is omitted herein. As illustrated in FIG. 7, the permanent magnet 3 is multi-polarized in such a way as to have 10 poles. In the resin member 2, sets 4 and 5 of two air-core coils, which are symmetrical with respect to the central axis of rotation of the rotor, are provided. That is, a total of 4 air-core coils 4 and 5 are provided in this resin member 2. The stepping motor is configured so that these air-core coils are evenly allocated to the first-phase coil and the second-phase coil.

Each of the air-core coils disposed in this way is placed in the main part 1. Thus, this embodiment can be formed into a shape, in which a dimension d (6.3 mm) being smaller than a diameter D (8 mm), by forming flat parts if and if obtained by planarizing portions of the main part 1 at symmetrical positions. Consequently, a partly flat stepping motor can be constructed. Moreover, during a closed magnetic circuit is formed, the generation of detent torque can be set by forming convex parts 1g and 1g, which respectively face n-pole and S-pole of the permanent magnet 3, in the flat parts 1f and 1f by, for instance, press working.

As described above, the invention can provide a stepping motor, which is prevented from being affected by detent torque during a driving operation and during a stop time, thereby to facilitate a micro-step driving operation and to improve a starting characteristic. Further, the invention can provide a stepping motor that can be constructed in such a way as to be compact and flat in a longitudinal direction along a shaft of rotation of a rotor. Moreover, as described above with reference to the stereographic exploded view shown in FIG. 5, the stepping motor of the invention can easily be manufactured. Especially, simplification of a winding step and an assembling step, and reduction in weight of a product are enabled owing to a shape of the motor, which is opened in the outer periphery thereof, and to decrease in the number of components, which is caused by changing the materials.

Figure 8:
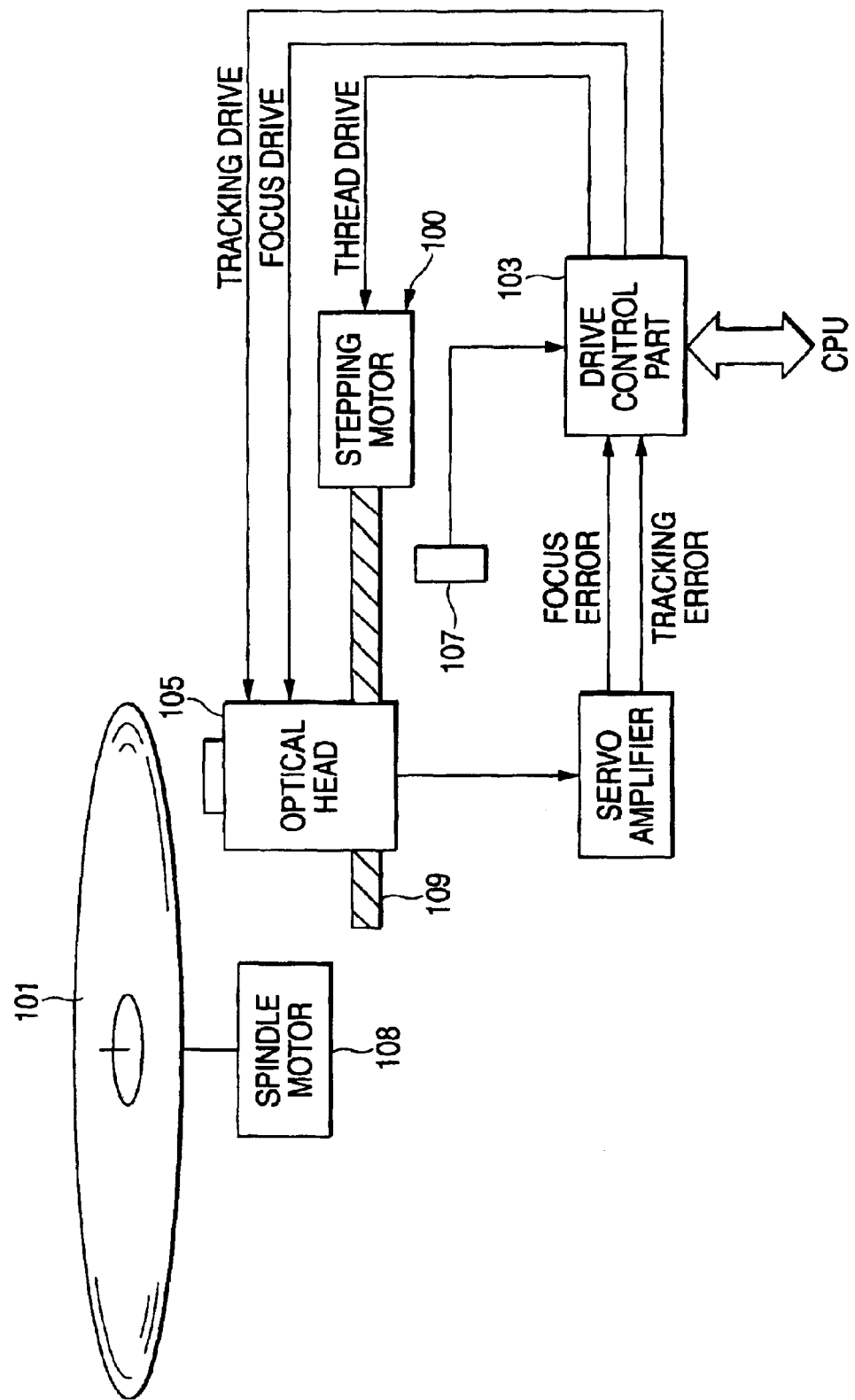
FIG. 8 is a block diagram showing a typical example of use of a stepping motor in a magneto-optical disk apparatus.

Referring finally to FIG. 8, there is shown block diagram, showing a typical example of use of the aforementioned stepping motor in a magneto-optical disk apparatus. As illustrated in this figure, a lead screw 109 is provided in the shaft of the stepping motor 100 in such a way as to be integral therewith or as to be a separate component. An optical head 105 is mounted on a carriage having a member screwed into this lead screw 109. The optical head 105 is controlled according to instructions issued from a drive control part 103 in such a way as to perform a predetermined driving operation. Furthermore, an optical disk 101 is driven by a spindle motor 108 to rotate at a high speed. A reference position is detected by a position detecting switch 107 for detecting the position of an innermost periphery.

In the apparatus of the aforementioned configuration, the optical head 105 is driven at a high speed in a radial direction of a recording/reproduction surface of an optical disk 101 that rotates at a high speed. Thus, this optical head needs to instantaneously stop. Consequently, rapid response of the stepping motor 100 is demanded. However, no detent torque is generated therein. Therefore, the enhancement of this rapidity of the response is enabled.

Alternatively, the stepping motor according to the invention is used in an autofocus mechanism of an optical camera. Thus, a driving operation of rotating the rotor in units of a stepping angle, which is finer than the conventionally employed stepping angle, is facilitated by performing micro-step driving.

As described above, the invention can provide a stepping motor, which is prevented from being affected by detent torque during a driving operation and during a stop time, thereby to facilitate a micro-step driving operation and to improve a starting characteristic.

Additionally, the invention can provide a stepping motor enabled to arbitrarily set a point of generation of detent torque so as to stop a rotor at a given angular position.

Further, the invention can provide a stepping motor that can be constructed in such a way as to be compact and flat in a longitudinal direction along a shaft of rotation of a rotor.

What is claimed is:

1. A stepping motor, comprising:
   a rotor including a shaft and a multi-polarized permanent magnet fixed to the shaft;
   a stator including a plurality of air-core coils, each air-core coil including a predetermined number of turns of wire wound around an axis perpendicular to a central axis of rotation of the rotor and placed along a peripheral surface of the permanent magnet with the air-core coils and the permanent magnet peripheral surface facing each other; and
   a housing surrounding the outer periphery of the air-core coils to form a magnetic circuit.

2. The stepping motor according to claim 1, wherein:
   the plurality of air-core coils comprise a set of first air-core coils and a set of second air-core coils,
   the set of first air-core coils faces the permanent magnet and is disposed at circumferentially equally spaced positions, and
   the set of second air-core coils is disposed at circumferentially equally spaced positions angularly spaced from the set of first air-core coils by an angular deviation, with a phase angle of 90 degrees,
   wherein generation of rotating torque, including a couple of forces, is enabled by energizing the set of first air-core coils and the set of second air-core coils.

3. The stepping motor according to claim 1, wherein:
   the permanent magnet is polarized so that the number of poles thereof is one of 2, 4, 6, 8, 10, and 12, and
   the number of the air-core coils is 2, 4, 6, and 8 to enable two-phase excitation driving operation, and
   the air-core coils are evenly allocated to first and second phase coils, respectively, along the peripheral surface of the permanent magnet to obtain an electrical angle of 90 degrees as the angular deviation.

4. The stepping motor according to claim 1, wherein each of the air-core coils is wound at an angular position at which a center of a nearly rectilinear constituent part thereof in a direction of rotation of the rotor contributing to rotation of the rotor coincides with a corresponding one of north poles and south poles of the permanent magnet.

5. The stepping motor according to claim 1, wherein the length of a conductor perpendicular to the magnetic field is increased as much as possible by setting the length of the nearly rectilinear constituent part of the air-core coils in the direction of rotation of the rotor to be equal to or greater than the length in the longitudinal direction along the axis of rotation of the permanent magnet.

6. The stepping motor according to claim 1 further comprising a supplemental yoke for arbitrarily setting a point of generation of detent torque so as to stop the rotor at a given angular position.

7. The stepping motor according to claim 1, wherein:
   the stator comprises a resin member integrally forming arm parts radially extending from inside a circular surface concentric with a center of rotation of the rotor to outside said circular surface, and
   the resin member holds the air-core coils so that the angular position relation between the air-core coils and magnetic poles of the permanent magnet is maintained.

8. The stepping motor according to claim 7, wherein the resin member has a supplemental yoke embedded therein for arbitrarily setting a point of generation of detent torque so as to stop the rotor at a given angular position.

9. The stepping motor according to claim 1, wherein;
   said stepping motor comprises a two-phase excitation type permanent magnet stepping motor enabled to prevent generation of detent torque therein and arbitrarily set the detent torque,
   the permanent magnet is polarized to have poles of a number that is one of 6, 8, 10, and 12,
   said stator includes a total of 4-four air-core coils, the air-core coils being divided into two sets of two air-core coils each so as to face each other,
   the two sets of two air-core coils are evenly allocated to first and second phase coils, respectively, along the peripheral surface of the permanent magnet so as to have an electrical angle of 90 degrees as an angular deviation therebetween to enable a two-phase excitation driving operation; and
   said housing comprises a yoke and has flat parts obtained by planarizing a space part between the air-core coils.

10. The stepping motor according to claim 1, wherein:
    said stepping motor comprises a two-phase excitation type permanent magnet stepping motor enabled to prevent generation of detent torque therein and arbitrarily set the detent torque, and
    the permanent magnet is polarized so as to have poles of a number that is one of 6, 8, 10, and 12.

11. The stepping motor according to claim 1, wherein said stator includes a total of four air-core coils divided into two sets of two air-core coils each so as to face each other.

12. The stepping motor according to claim 11, wherein the two sets of two air-core coils are evenly allocated to first and second phase coils, respectively, along the peripheral surface of the permanent magnet so as to have an electrical angle of 90 degrees as an angular deviation therebetween to enable a two-phase excitation driving operation.

13. The stepping motor according to claim 6 wherein the supplemental yoke comprises a magnetic material.

14. The stepping motor according to claim 1 wherein said housing comprises a yoke and has flat parts obtained by planarizing a space part between the air-core coils.

15. A stepping motor, comprising:
    a rotor including a shaft and a multi-polarized permanent magnet fixed to the shaft;

a stator including a plurality of air-core coils, each air-core coil being positioned along a peripheral surface of the permanent magnet with the air-core coils and the permanent magnet peripheral surface facing each other; and a detent yoke having flat parts obtained by planarizing a part between the air-core coils.

16. The stepping motor according to claim 15, wherein:

the permanent magnet is polarized so that the number of poles thereof is one of 2, 4, 6, 8, 10, and 12, and the number of the air-core coils is one of 2, 4, 6, and 8 to enable two-phase excitation driving operation, and the air-core coils are evenly allocated to first and second phase coils, respectively, along the peripheral surface of the permanent magnet to obtain an electrical angle of 90 degrees as the angular deviation.

17. The stepping motor according to claim 15, wherein:

the stator comprises a resin member integrally forming arm parts radially extending from inside a circular surface concentric with a center of rotation of the rotor to outside said circular surface, and the resin member holds the air-core coils so that the angular position relation between the air-core coils and magnetic poles of the permanent magnet is maintained.

18. A stepping motor, comprising:

a rotor including a shaft and a multi-polarized permanent magnet fixed to the shaft;

a stator including a plurality of air-core coils, each air-core coil made from a predetermined number turns of wire wound around an axis perpendicular to a central axis of rotation of the rotor, and each air-core coil being placed along a peripheral surface of the permanent magnet so that the air-core coils face each other; and a supplemental yoke formed from a magnetic material for arbitrarily setting a point of generation of detent torque so as to stop the rotor at a given angular position.

19. The stepping motor according to claim 18, wherein:

the permanent magnet is polarized so that the number of poles thereof is one of 2, 4, 6, 8, 10, and 12, and the number of the air-core coils is one of 2, 4, 6, and 8 to enable two-phase excitation driving operation, and the air-core coils are evenly allocated to first and second phase coils, respectively, along the peripheral surface of the permanent magnet to obtain an electrical angle of 90 degrees as the angular deviation.

20. The stepping motor according to claim 18, wherein:

the stator comprises a resin member integrally forming arm parts radially extending from inside a circular surface concentric with a center of rotation of the rotor to outside said circular surface, and the resin member holds the air-core coils so that the angular position relation between the air-core coils and magnetic poles of the permanent magnet is maintained.

* * * * *